US011016285B2

(12) United States Patent
Po et al.

(10) Patent No.: US 11,016,285 B2
(45) Date of Patent: May 25, 2021

(54) SHUTTERED SWITCH MIRROR

(71) Applicant: Raytheon Company, Waltham, MA (US)

(72) Inventors: Li Chiao Po, La Habra Heights, CA (US); Eric J. Griffin, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 182 days.

(21) Appl. No.: 16/369,254

(22) Filed: Mar. 29, 2019

(65) Prior Publication Data
US 2020/0310108 A1   Oct. 1, 2020

(51) Int. Cl.
G02B 26/00 (2006.01)
G02B 26/08 (2006.01)

(52) U.S. Cl.
CPC ................. *G02B 26/0816* (2013.01)

(58) Field of Classification Search
CPC ............ G02B 26/0816; G02B 13/0065; G02B 7/1821
USPC ........................................................ 250/234
See application file for complete search history.

(56) References Cited

U.S. PATENT DOCUMENTS

| 4,482,252 | A | 11/1984 | Lorenz |
| 4,498,730 | A | 2/1985 | Tanaka et al. |
| 5,535,293 | A | 7/1996 | Buchin |
| 6,031,946 | A | 2/2000 | Bergmann et al. |
| 7,567,287 | B2 * | 7/2009 | Hyatt ............... H04N 5/2254 348/340 |
| 2010/0066893 | A1 | 3/2010 | Tsou |
| 2017/0176739 | A1 | 6/2017 | Miller et al. |

FOREIGN PATENT DOCUMENTS

EP   0 390 641 A1   10/1990

OTHER PUBLICATIONS

PCT International Search Report and Written Opinion dated Apr. 30, 2020 for International Application No. PCT/US2020/012823; 13 Pages.

* cited by examiner

*Primary Examiner* — Kevin K Pyo
(74) *Attorney, Agent, or Firm* — Daly, Crowley, Mofford & Durkee, LLP

(57) ABSTRACT

Methods and apparatus for a sensor system having a structure having a reflective surface, wherein the structure is rotatable about a longitudinal axis. Channels provide respective paths from an entry into the channels to the reflective surface. A shroud selectively block ones of the channels to provide an operational configuration and a calibration configuration.

18 Claims, 14 Drawing Sheets

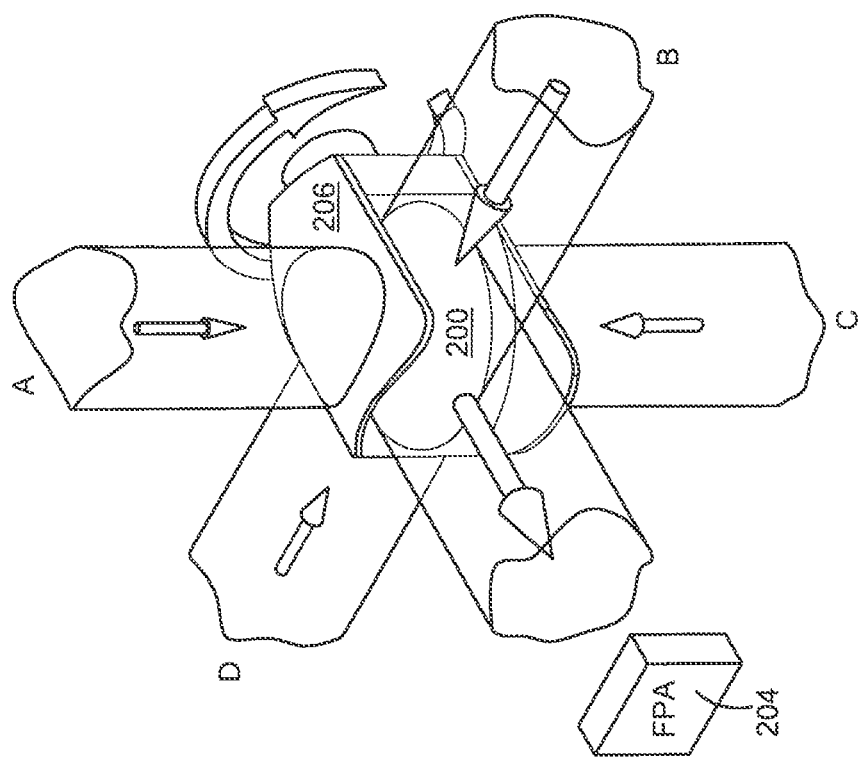
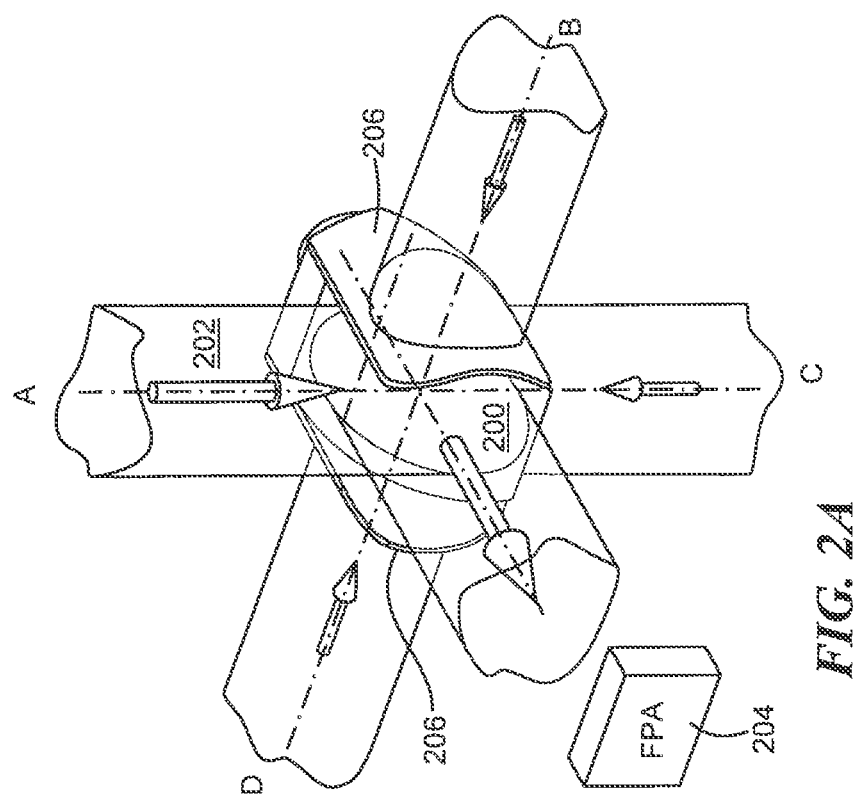

SHUTTERED SWITCH MIRROR

BACKGROUND

As is known in the art, sensors, such as a focal plane array (FPA), will need to be calibrated to improve picture quality and/or avoid false interpretation of targets. Pictures without Non-Uniformity Calibration (NUC) can have false hot spots caused by uncalibrated pixels. This is particularly problematic when searching for hot (bright) targets on a cold (dark) background, such as an aircraft against clear sky. False hot spots can be interpreted as aircraft. In some conventional systems, a thermal reference source (TRS) is used for Non-Uniformity Calibration (NUC) of a Focal Plane Array (FPA). This process needs time for the TRS to reach stabilized operating temperature before calibration can begin in order to maintain the highest calibration repeatability. In known systems, to maintain NUC readiness during operation, the TRS remains turned on. A constant IR source next to the main ray path will introduce unwanted stray light that can degrade image quality. Conversely, stray light caused by the incoming light may affect NUC accuracy if left uncontained.

Some known systems include a non-integrated powered shutter to cover TRS emission which can increase cost, complexity and bulkiness. Other conventional systems use the fold mirror itself that switches in and out of the TRS ray path to block the IR from entering the volume that houses the operating main beam path. This method of shuttering requires that the mirror be pivoted away from the center of gravity, causing increased level of vibration due to inertia or increased Wave Front Error (WFE) due to bending of the switch mirror.

SUMMARY

Embodiments of the invention provides systems and methods for a sensor system having a shroud optionally painted with light absorbing paint that provides shielding from stray light for a sensor, such as a FPA. In example embodiments, the sensor system includes Focal Plane Array (FPA), Thermal Reference Source and Black Body targets that provide the capability to conduct calibrations. In embodiments, the mirror has an axis of rotation that is in-line with the ray path of the sensor. The mirror is free to rotate the entire 360 degrees, providing the room to place more than one input source to be engaged by the FPA. The mirror may have an angle, e.g., 45 degrees, so that the beam switching ratio is one degree rotation of the mirror translates into one degree of beam rotation. The mirror angle, as well as the number of inputs, can vary but may be limited by the ability of the shroud to effectively shield the operating beam from other incoming rays.

In an aspect, a sensor system comprises: a body having a reflective surface, wherein the body is rotatable about a longitudinal axis; a plurality of channels providing respective paths for an entry into the channel to the reflective surface; and a shroud to selectively block one or more of the channels, wherein the shroud has a first position to create a path from a first channel of the plurality of channels configured for receiving target energy to the reflective surface while blocking at least a second channel of the plurality of channels, and a second position to create a path from the second channel configured for receiving configuration energy to the reflective surface while blocking at least the first channel.

A sensor system can further include one or more of the following features: a sensor array to receive energy reflected by the reflective surface, the sensor array comprises a focal plane array (FPA), an actuator to control a position of the reflective surface and/or the shroud, a thermal reference source to provide the calibration standard, the channels comprise first and second channels that are substantially perpendicular to each other, the channels comprise first, second, third, and fourth channels, the first, second, third, and fourth channels are each separated by about ninety degrees, the shroud and the reflective surface are made of different parts or machined from the same block of material, and/or the shroud moves dependently, semi-independently or independently of the reflective surface.

In another aspect, a method comprises: employing a body having a reflective surface in a sensor system, wherein the body is rotatable about a longitudinal axis; employing a plurality of channels to provide respective paths from an entry into the channels to the reflective surface; and employing a shroud to selectively block one or more of the channels, wherein the shroud has a first position to create a path from a first channel of the plurality of channels configured for receiving target energy to the reflective surface while blocking at least a second channel of the plurality of channels, and a second position to create a path from the second channel configured for receiving configuration energy to the reflective surface while blocking at least the first channel.

A method can further include one or more of the following features: employing a sensor array to receive energy reflected by the reflective surface, the sensor array comprises a focal plane array (FPA), employing an actuator to control a position of the shroud and/or the reflective surface, employing a thermal reference source to provide the configuration energy, the channels comprise first and second channels that are substantially perpendicular to each other, the channels comprise first, second, third, and fourth channels, the first, second, third, and fourth channels are each separated by about ninety degrees, the shroud and the reflective surface are made of different parts or machined from the same block of material, and/or the shroud moves dependently, semi-independently or independently of the reflective surface.

BRIEF DESCRIPTION OF THE DRAWINGS

The foregoing features of this invention, as well as the invention itself, may be more fully understood from the following description of the drawings in which:

FIG. 2A is a schematic representation of a portion of a sensor system having a shroud in a first position to enable target return energy to reflect to a sensor array;

FIGS. 2B and 2D are schematic representations of a portion of a sensor system having a shroud in a second position to enable calibration energy to reflect to a sensor array;

DETAILED DESCRIPTION

Figure 1:
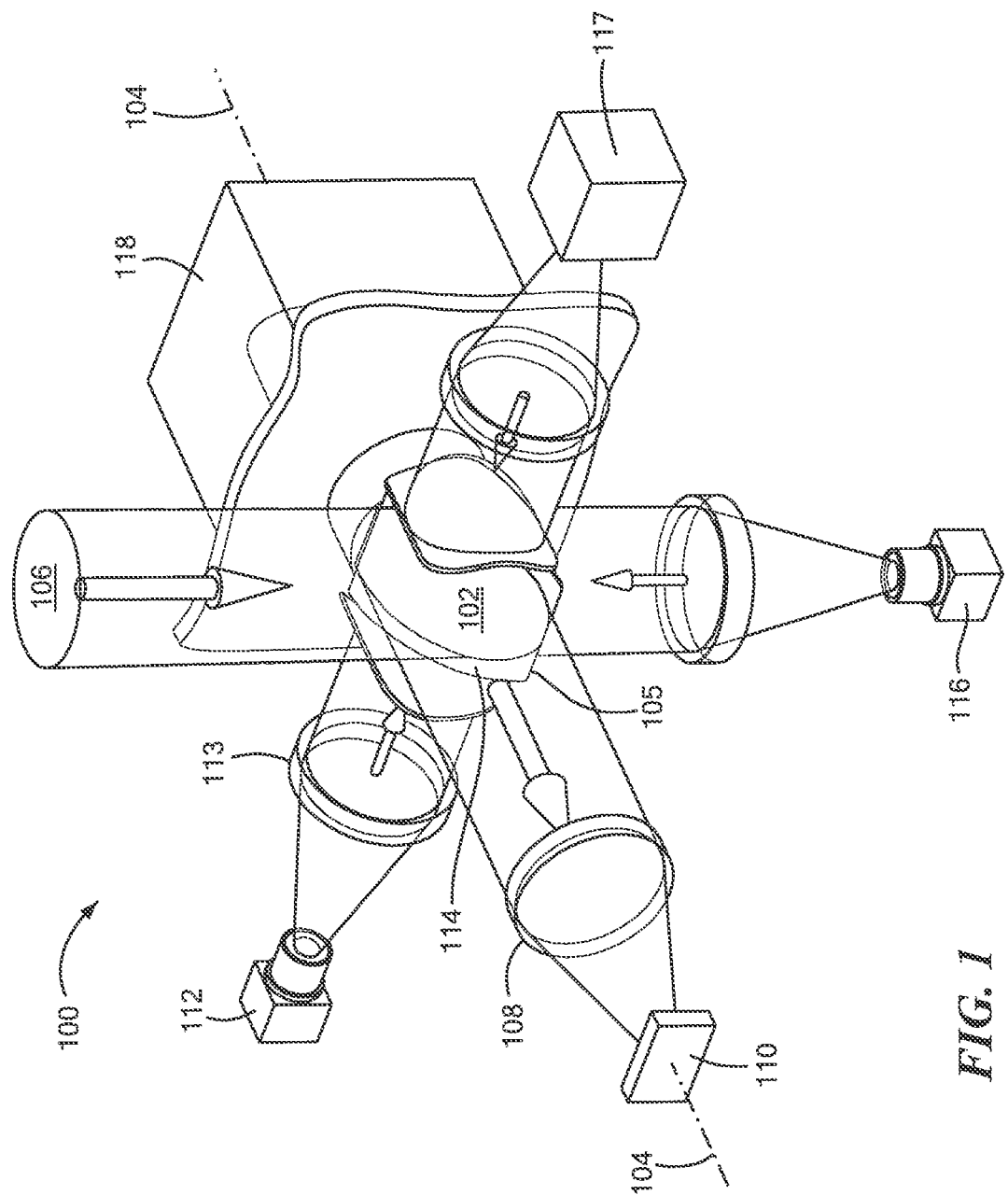
FIG. 1 is a representation of a sensor system with a reflective surface at 45 degrees to the FPA shielded by a shroud rotatable in relation to multiple stationary input sources.

FIG. 1 shows an example sensor system 100 having a reflective surface 102, which can be provided as a mirror that is rotatable about an axis 104. In embodiments, an assembly 105 includes a body have a portion providing the reflective surface 102. The sensor system 100 has a first path in which the reflective surface 102 is in a first position to reflect incoming light energy 106 (e.g., target energy) to a first lens 108, which focuses the light energy 106 onto a focal plane array (FPA) 110. This configuration may be referred to as a sensing or operational configuration. In embodiments, the incoming light energy 106 includes infrared light and the sensor 110 comprises infrared sensing elements.

The sensor system 100 includes a first thermal reference source (TRS) 112 that can be used for non-uniformity calibration (NUC) of the FPA 110. A lens 113 can be used for focusing the light energy (e.g., calibration energy) from the TRS 112 as desired onto the reflective surface 102. The TRS 112 may remain active to constantly emit energy to maintain a given operating temperature for enabling calibration without delays associated with warmup to the given operating temperature. In the illustrated sensing configuration, a shroud 114 blocks light energy from the TRS 112 from reaching the reflective surface 102, and thus, from reaching the FPA 110. It will be appreciated that in the operating configuration it is desirable to detect light energy from a target and undesirable to have TRS energy or other stray light reach the sensing elements of the FPA 110.

As shown in the illustrated embodiment, a second TRS 116 can be provided that may be set at a different temperature for NUC of the FPA 110. Light energy from the second TRS 116 is also blocked by the assembly 105. A black body target 117 can be used to provide line of sight (LOS) calibration information for the pointing servo controls. Black body target 117 is selectively blocked by shroud 114.

The sensor system 100 can include an actuator system 118 to control rotation of the reflective surface 102 and the shroud 114 about the axis 104. In embodiments, the actuator 118 can control the position of the reflective surface 102 and the shroud 114 independently. In another embodiment, the shroud is mounted to the mirror. In another embodiment, the shroud is independent, but driven by the mirror until the operating position where the shroud will snap onto a mechanical or magnetic detent thus disengage from the mirror to reduce vibration during operation.

Figure 2C:
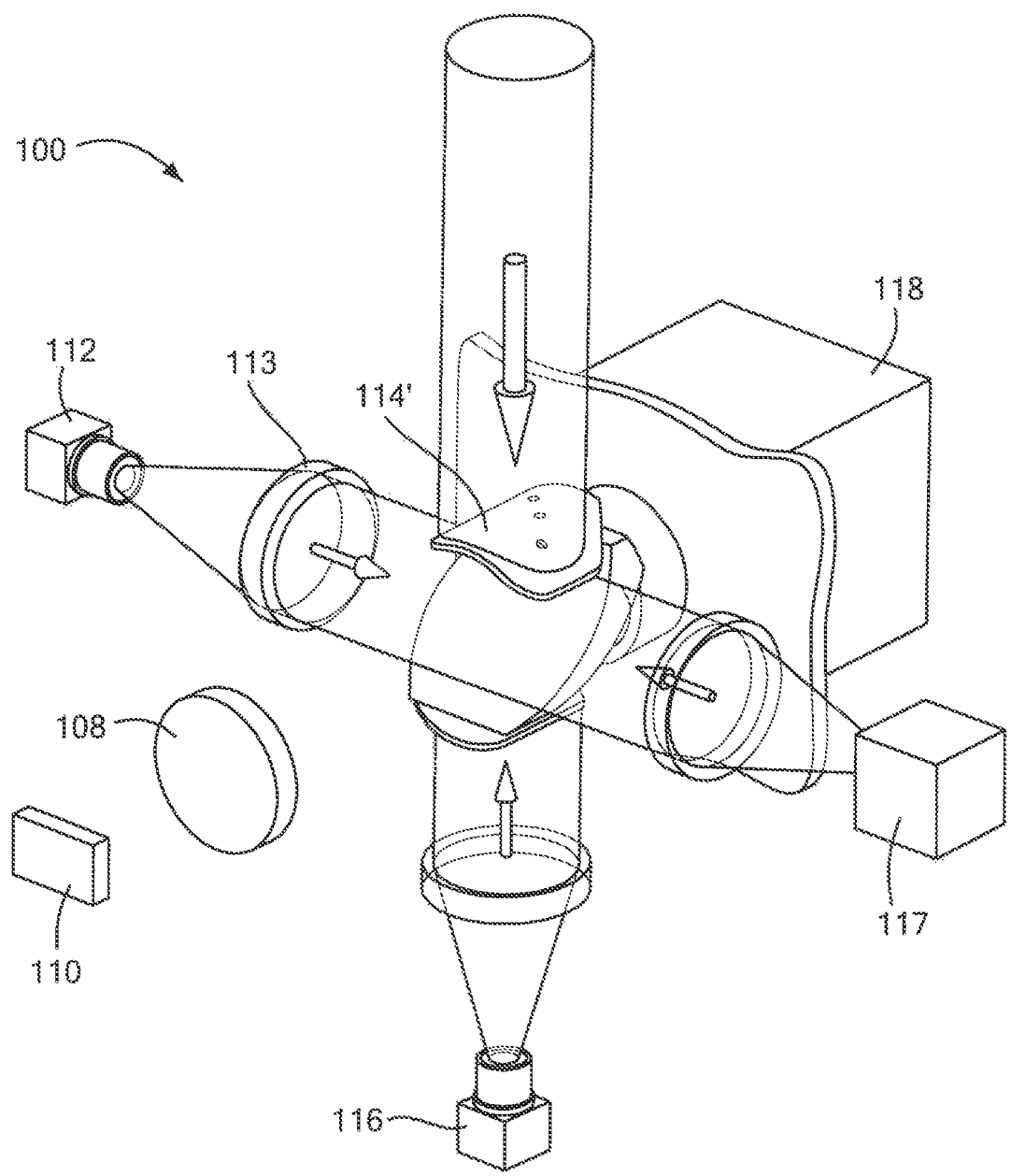
FIG. 2C is a schematic representation of a portion of a sensor system having a shroud and reflective surface positioned to block all channels.
Figure 2D:
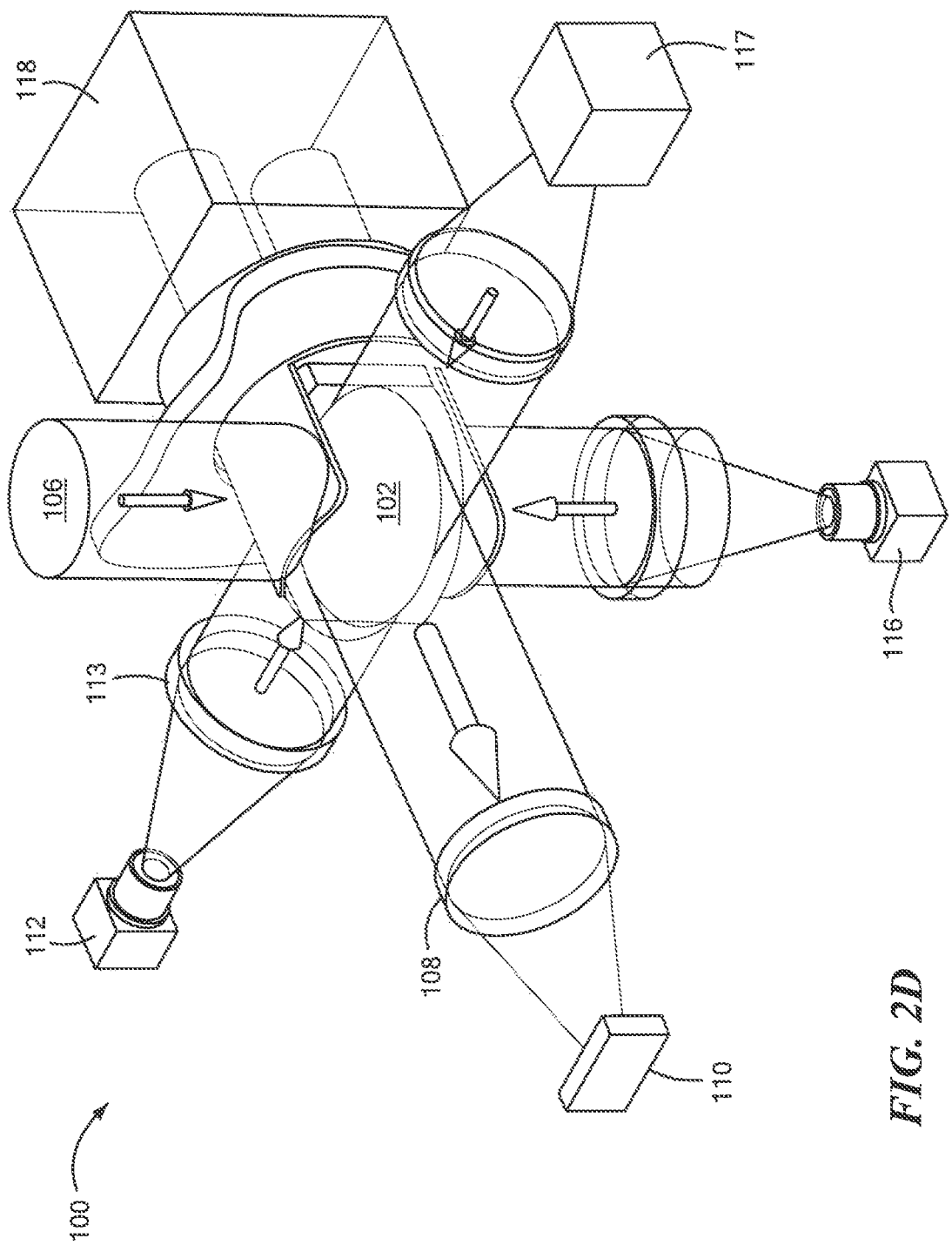

FIG. 2A shows an example operational configuration/mode, which can be similar to FIG. 1, and FIGS. 2B and 2D show a calibration configuration/mode, which provides a path for TRS (112, FIG. 1) energy to reach the FPA (110 FIG. 1) via a reflective surface 200, such as a mirror. FIG. 2C shows an independently controlled shroud 114 in a position to enable none of the inputs to get to the FPA. In an example embodiment, the reflective surface 200 has four positions each separated by ninety degrees. A zero degree position of the reflective surface 200, as shown in FIG. 2A, defines the operational configuration in which light energy 202 from a target reflects off the reflective surface 200 onto the sensing elements of the FPA 204. In this configuration, channel A is open and channels B, C, D are blocked. In the illustrated embodiment, a shroud 206 blocks energy from channel B and channel D. Energy from channel C is blocked by the non-reflective side of the assembly having the reflective surface 200.

FIG. 2B shows the reflective surface 200 rotated ninety degrees so that TRS energy from channel B is reflected by the reflective surface 200 to the FPA 204. In the illustrated embodiment, channel A, channel C and channel D are blocked. It will be appreciated that the reflective surface 200 and shroud 206 can be moved to enable energy from any of channels A, B, C, D to reach the mirror for reflection onto the FPA 204.

In the example embodiment, the shroud 206 rotates with the reflective surface 200 to block and unblock channels as desired. As can be seen in FIG. 2B, TRS energy enters channel B, reflects off the reflective surface 200, and travels to the FPA 204 for calibration of the system.

In embodiments, the reflective surface 200 can be rotated 180 degrees from the configuration of FIG. 2B to unblock channel D through TRS energy can reflect off the reflective surface 200 to the FPA 204 for calibration.

FIG. 2C shows the shroud 114 and reflective surface positioned to shut out all channels so that no energy from any of the channels reaches the FPA 110.

It is understood that the system can include any practical number of paths to the reflective surface and that the paths can be separated from each other in symmetrical and non-symmetrical arrangements to meet the needs of a particular application. Any suitable number of TRS elements can be provided which may generate the same energy or different type of energy, power, etc.

Figure 3A:
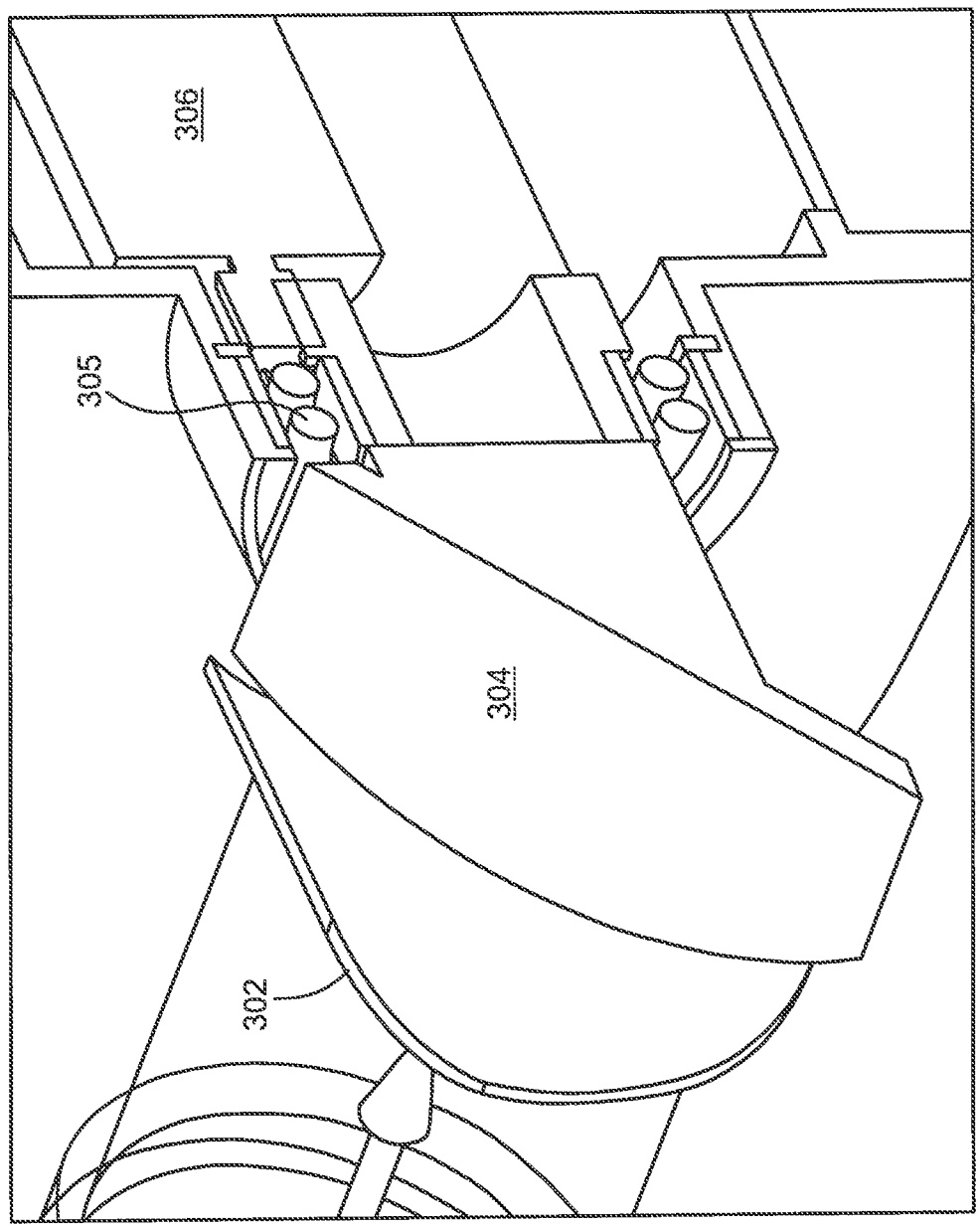
FIG. 3A is a representation of the sensor system of FIG. 1 in partial cutaway where the shroud moves with the reflecting surface.

FIG. 3A is a representation of the sensor system of FIG. 1 in partial cutaway where a shroud 302 moves with a reflecting surface 304. The shroud 302 is mounted directly to the reflecting surface 304. A motor mirror 306 controls a position of the reflecting surface 304 and shroud 302. In the illustrated embodiment, the reflecting surface 304 is inclined at an angle of 45 degrees with respect to an FPA (110 in FIG. 1). The reflective surface 304 can rotate about a bearing 305 having an axis pointing to the FPA.

Figure 3B:
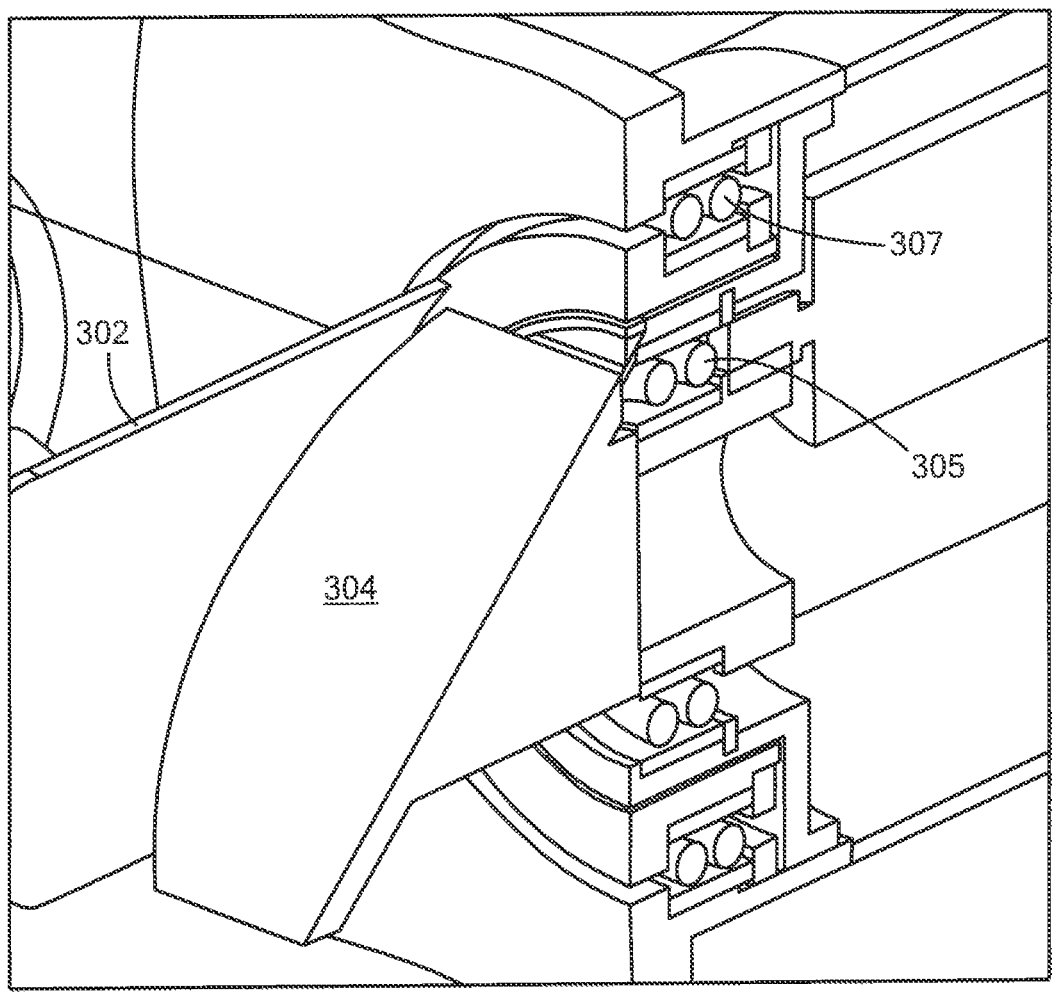
FIG. 3B is a representation of the sensor in FIG. 1 in partial cutaway where the shroud moves driven by the mirror but snaps into detents, detached from the mirror at different operating position.

FIG. 3B is a representation of the sensor of FIG. 1 in partial cutaway where the shroud 302 moves driven by the reflective surface 304 but is in detent and detached from the reflective surface at different operating positions. In the illustrated embodiment, the reflective surface 304 is inclined at 45 degrees with respect to an FPA (110 in FIG. 1). The shroud 302 is seated on its own bearing 307 but driven by the reflective surface via a pin and hole configuration, for example. The shroud 302 may stop on indents at prescribed positions to decouple from the reflective surface 304, which rotates about a bearing 305 and its axis pointing to the FPA.

Figure 3C:
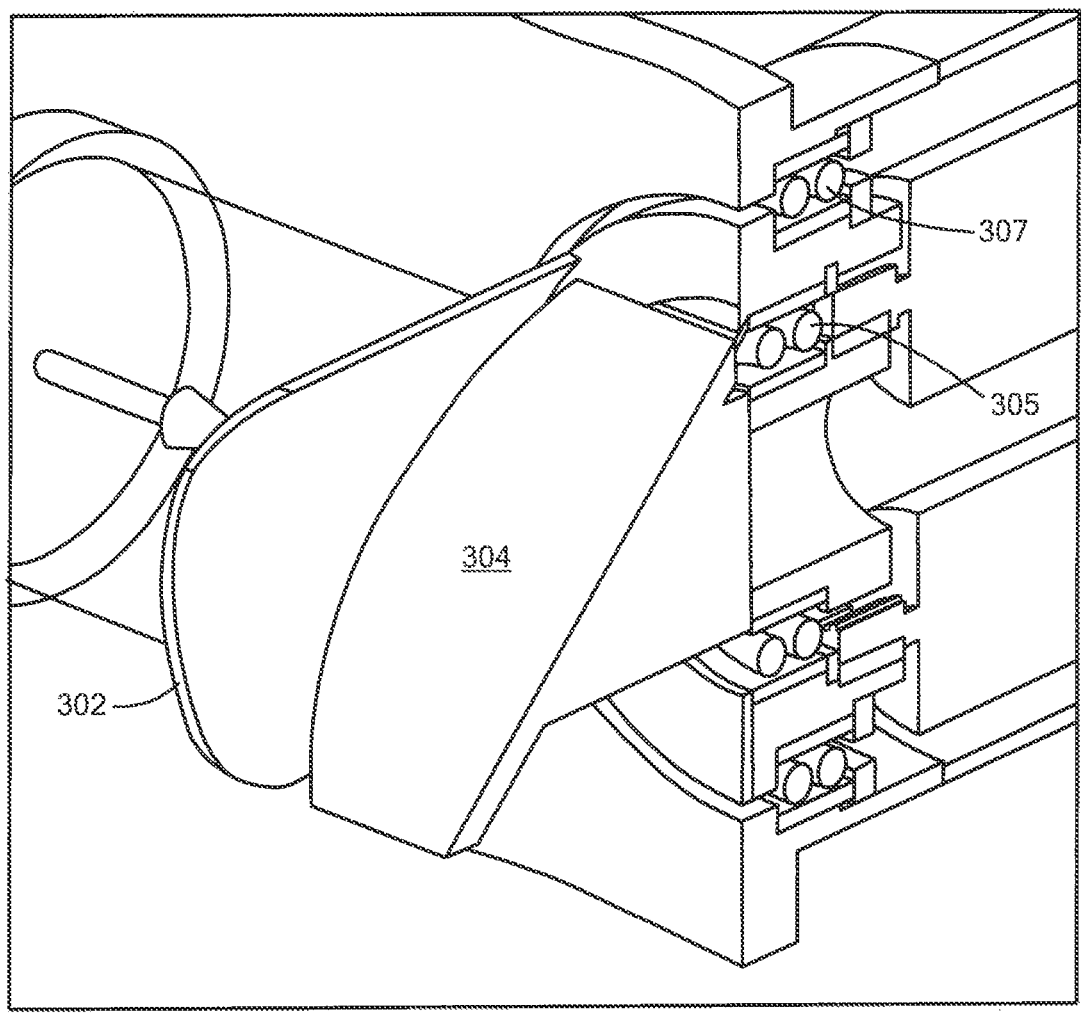
FIG. 3C is a representation of the sensor system of FIG. 1 in partial cutaway where the shroud moves under its own power.

FIG. 3C is a representation of the sensor system of FIG. 1 in partial cutaway where the shroud 302 is attached to its own bearing 307 and is moved under its own power. The shroud 302 can rotate independently to any angle and it is decoupled from the mirror.

It will be appreciated that wherein the shroud 302 is not connected to a reflective surface 304, dynamic interference of the reflective surface 304 by the shroud 302 is reduced. It will be appreciated that vibration and other perturbations of the reflective surface 304 can degrade the integrity of data on the FPA 310 which can reduce sensor performance. Rotation of the shroud 302 blocks and unblocks channels aligned with TRS 308, as described above.

In some embodiments, the shroud 302 and reflective surface 304 move together. In other embodiments, the shroud 302 and the reflective surface 304 move independently of each other and can be independently controlled.

Figure 4A:
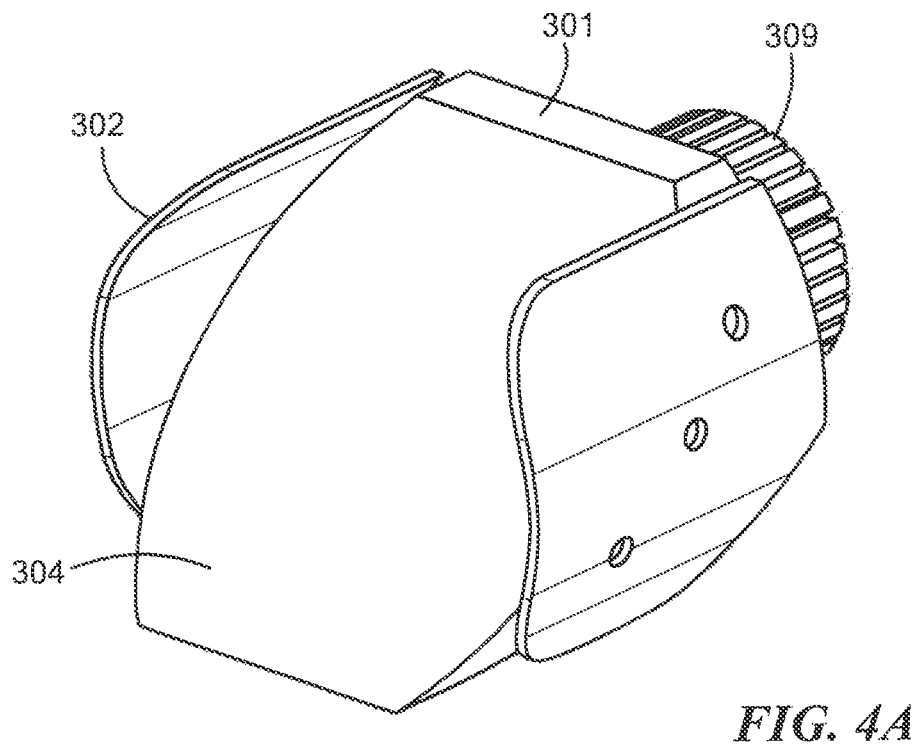
FIGS. 4A and 4B are schematic representations of a shroud mechanically attached to a body having a reflective surface for use with the system of FIG. 3A.
Figure 4B:
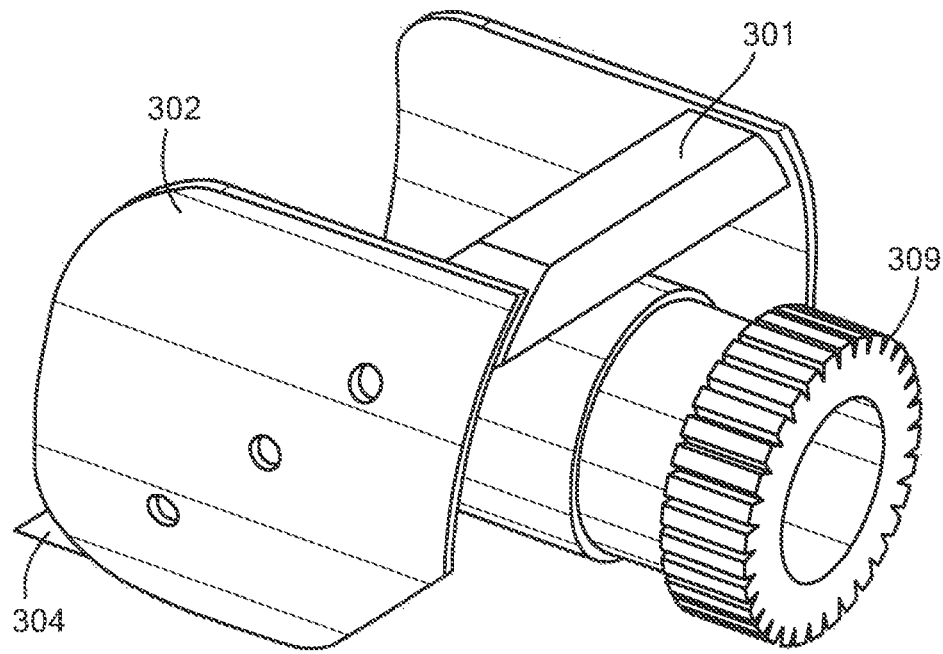

FIGS. 4A and 4B show a body 301 with a reflective surface 304 to which the shroud 302 is secured to. The shroud 302 moves with the reflective surface 304. The body 301 includes an engagement mechanism 309 for coupling to a motor for rotating the body 302 and reflective surface 304. The illustrated body 301 is useful for the system shown in FIG. 3A.

Figure 4C:
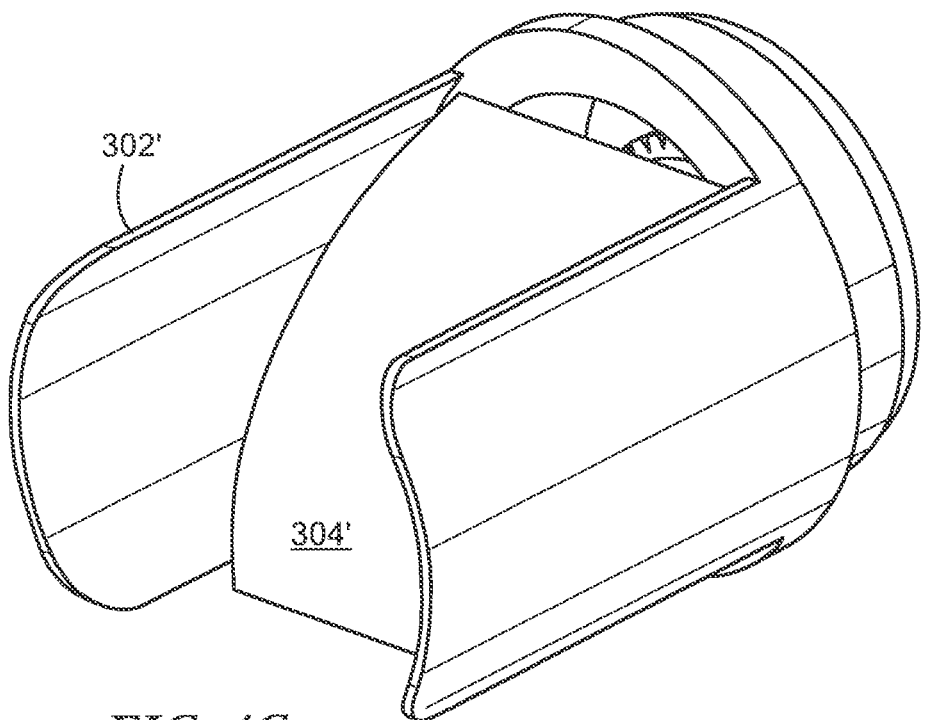
FIGS. 4C and 4D are schematic representations of a shroud semi-independent from a body having a reflective surface but rotates about the same axis for use with the system of FIG. 3B.
Figure 4D:
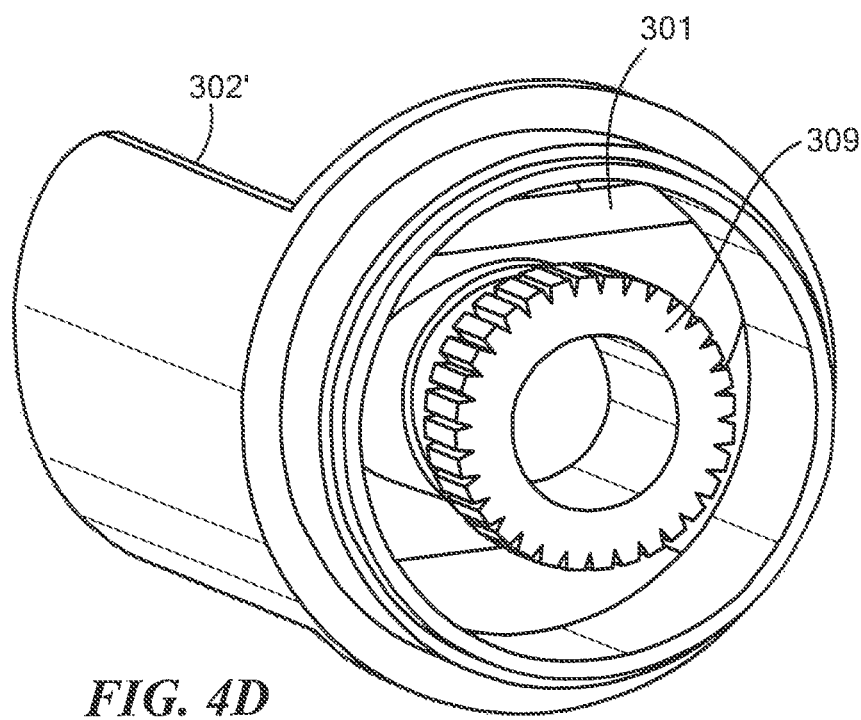

FIGS. 4C and 4D show a body 301' loosely securable to a rotatable assembly having a shroud 302'. The body 301' includes a reflective surface 304'. The shroud 304' has its own bearing to rotate on independently but not its own drive motor, as shown in FIG. 3B. The body 301' can include an engagement mechanism 309' for coupling to a motor. (not shown)

Figure 4E:
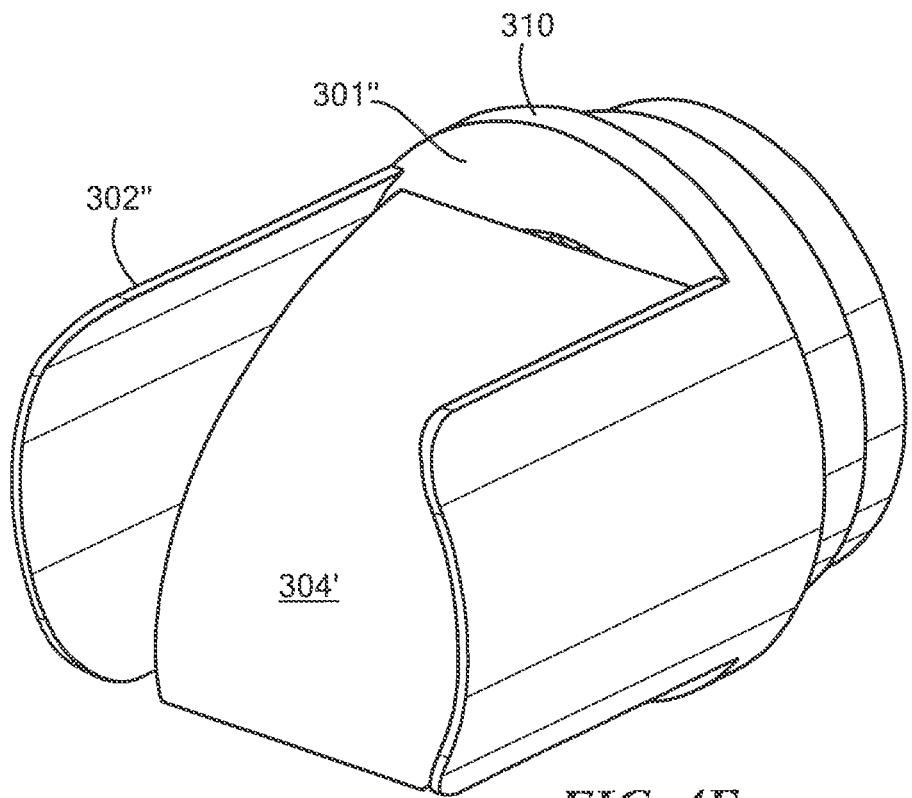
FIGS. 4E and 4F are schematic representations of a shroud independent from a body having a reflective surface but rotates about the same axis for use with the system of FIG. 3C.
Figure 4F:
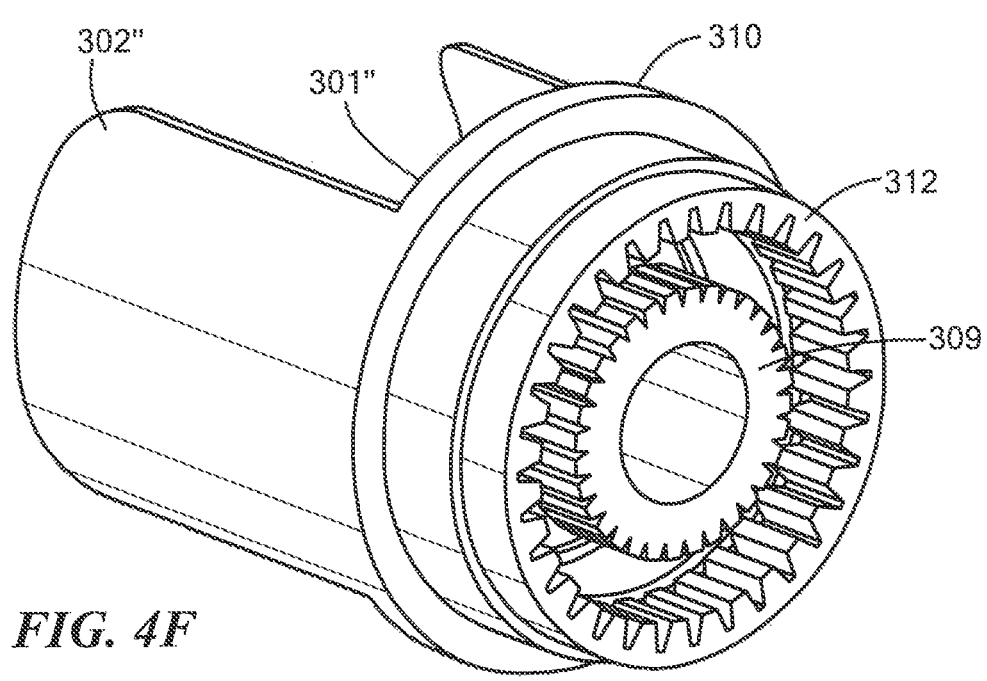

FIGS. 4E and 4F show a body 301" completely decoupled from a reflective surface 304' with a rotatable assembly 310 having a shroud 302". The body 301" includes a reflective surface 406. The shroud 302 has its own bearing and drive motor. The body 301" can include an engagement mechanism 309' for coupling to a motor (not shown) and the rotatable assembly can include an engagement mechanism 312 for coupling to a different motor (not shown).

Figure 5:
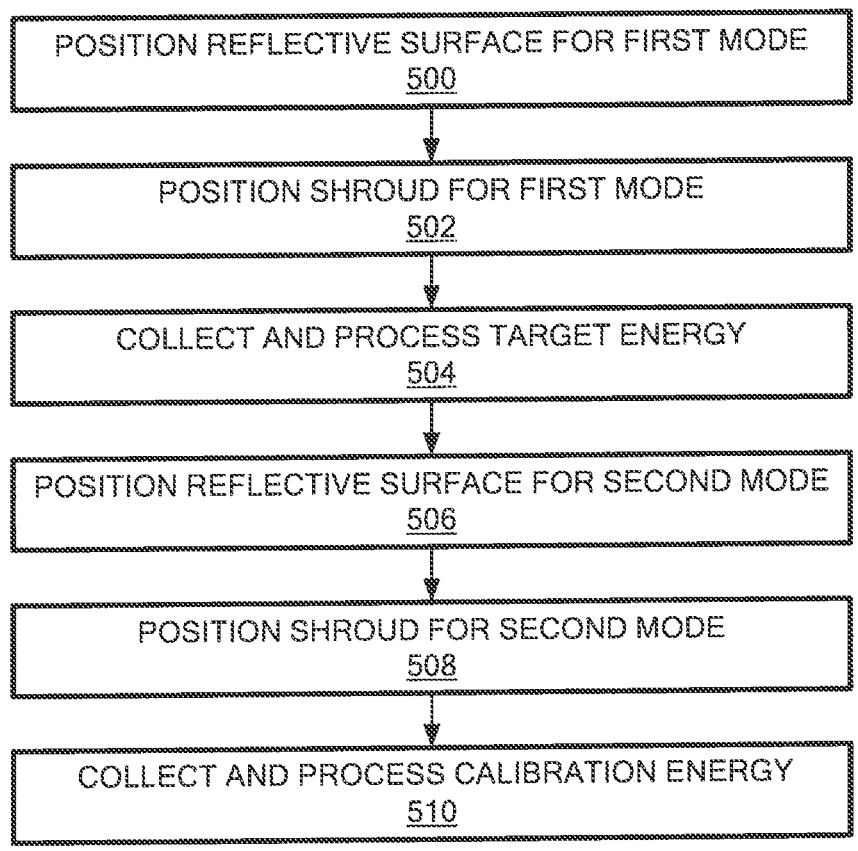
FIG. 5 is a flow diagram showing an example sequence of steps to manipulate a shroud and mirror between operational and calibration configurations.

FIG. 5 shows an example sequence of steps for providing sensor operation and calibration configurations. In step 500, an assembly (e.g., 105 in FIG. 1) having a reflective surface (e.g., 102 in FIG. 1) is rotated to an operational position corresponding to a first mode. In embodiments, an actuator (e.g., 118 in FIG. 1) rotates the reflective surface. In step 502, a shroud (e.g., 114 in FIG. 1) is manipulated to the operational position, such as by the actuator. In step 504, target return data received by the sensor, such as a FPA (e.g., 110 in FIG. 1), for the operational configuration is collected and processed. In embodiments, the shroud and reflective surface are coupled together, and thus, move in unison, thus combining steps 500 and 502. In an example operational configuration, a path is provided for target return energy to reflect off the reflective surface, e.g., mirror, to a sensor array, such as a FPA. Other paths to the reflective surface are blocked by the shroud or the assembly. In other embodiments, the shroud and reflective surface are controlled independently, such as by the actuator or other controller.

In step 506, the assembly with the reflective surface is rotated to a calibration position corresponding to a second mode and in step 508, the shroud is manipulated to the calibration position. In embodiments, the shroud and reflective surface are coupled together, and thus, move in unison, thus combining steps 506 and 508. In example calibration configuration, TRS energy is provided a path to the reflective surface and received by the sensor array of FPA for calibration processing in step 510. In embodiments, the shroud blocks the path for target return energy to reach the reflective surface.

It is understood that the reflective surface and shroud can comprise any suitable material to meet the needs of a particular application. In embodiments, the reflective surface comprises Aluminum. In embodiments, the reflective surface and/or shroud comprise Aluminum. The shroud and mounting screws can be Aluminum to minimize CTE (coefficient of thermal expansion) mismatch. In embodiments, the shroud covered with a light-absorbing material to absorb, e.g., over 90 percent, of light so as to reduce stray light in the vicinity of the main beam.

Embodiments of the invention can include multiple TRS sources that can be continuously operating sources for multi-temperature calibration. Alternative embodiments can provide auto-alignment using auto-alignment sources for periodic calibration without risking boresight shifts induced by power up thermal transients. Some embodiments include multiple aperture applications that can switch between LWIR and MWIR paths without the risk of introducing stray light from the unused path.

Embodiments of the invention provide a sensor system having a shroud that block rays of conic shape, is lightweight to minimize inertial reaction on the mirror, and maintains a high natural frequency to decouple from the auto alignment frequency. In embodiments, additive manufacturing (AM) can be used to produce the shroud.

Embodiments of the invention provide certain advantages over conventional systems. One contributor to line of sight (LOS) repeatability error is at the resting point of the mirror. The configuration of a 45 degree inclined mirror coupled with the axis of rotation pointing in the direction of the FPA results in a beam deflecting angle ratio of 1:1, meaning the mirror rotates 1 degree to bend the output light 1 degree. With the usual off axis pivoting mirror similar to the operation of a door, the beam deflecting angle ratio is 1:2, meaning the output ray LOS error at the resting point will be doubled.

Figure 6A:
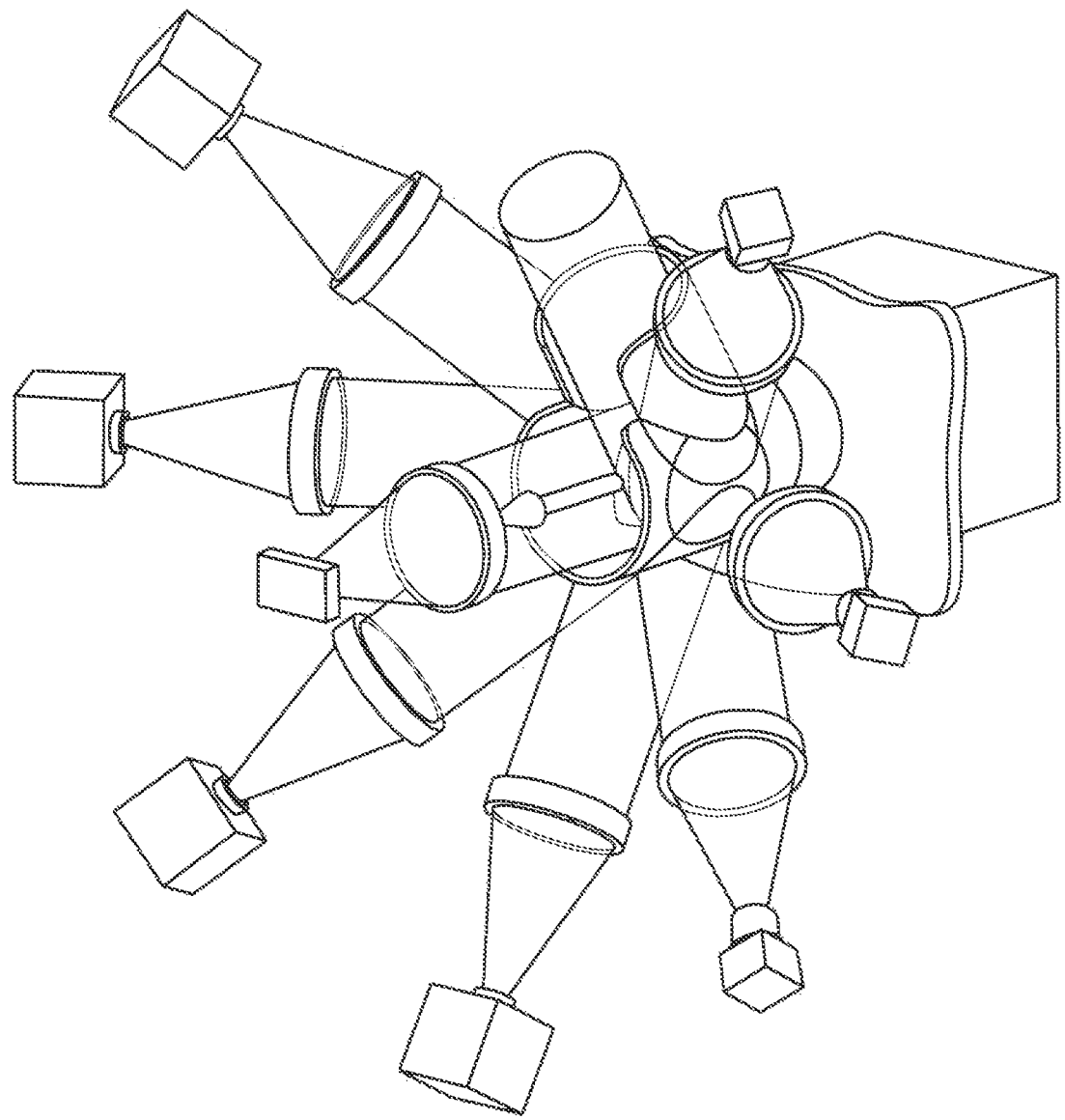
FIGS. 6A and 6B are schematic representations of an example sensor system with a shroud and a reflective surface at thirty degrees and having eight inputs.
Figure 6B:
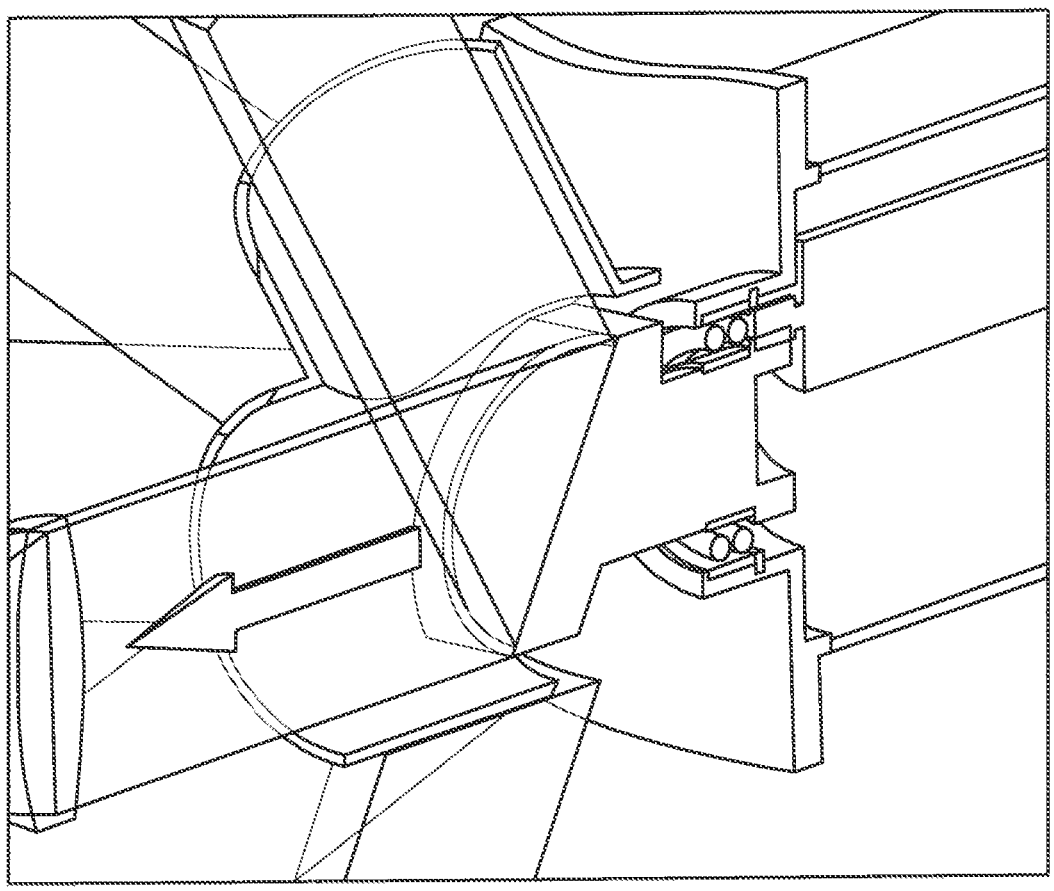

It is understood that any practical number of channels can be provided and that the reflecting surface angle can vary to meet the needs of a particular application. For example, FIGS. 6A and 6B shows an illustrative sensor system having eight channels at a thirty degree angle.

Figure 7:
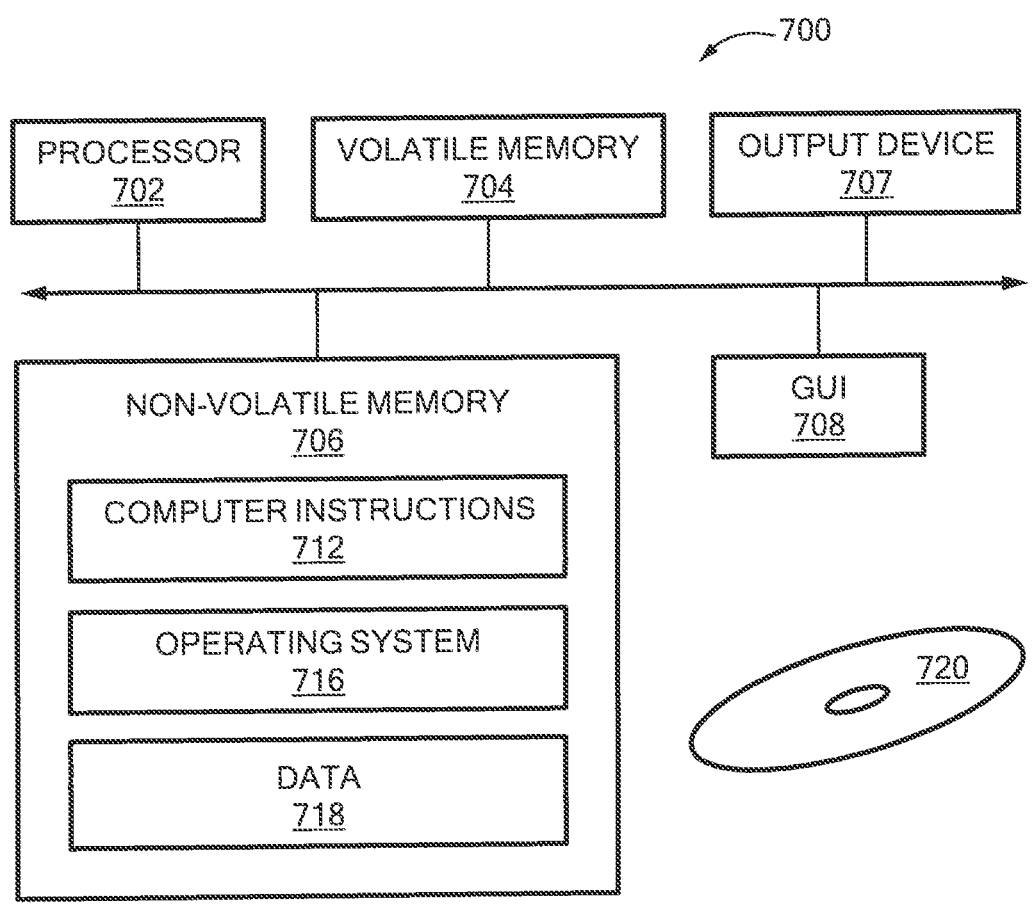
FIG. 7 is a schematic representation of an example computer that can perform at least a portion of the processing described herein.

FIG. 7 shows an exemplary computer 700 that can perform at least part of the processing described herein, such as the operational and/or calibration processing described with FIG. 5 in controlling the position of a reflective surface and/or shroud. The computer 700 includes a processor 702, a volatile memory 704, a non-volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A sensor system, comprising:
   a body having a reflective surface, wherein the body is rotatable about a longitudinal axis;
   a plurality of channels providing respective closed paths from an entry into the channels to the reflective surface, wherein the plurality of channels comprises first, second, third, and fourth channels;
   a shroud to selectively block one or more of the channels, wherein the shroud has a first position to create a path from a first channel of the plurality of channels configured for receiving target energy to the reflective surface while blocking at least a second channel of the plurality of channels, and a second position to create a path from the second channel configured for receiving configuration energy to the reflective surface while blocking at least the first channel; and
   a sensor array to receive energy reflected by the reflective surface,
   wherein the shroud in the first position is configured such that energy from the first channel is reflected by the reflective surface to the sensor array, energy from the second and third channels is blocked by the shroud from reaching the sensor array, and energy from the fourth channel is blocked by the body and/or the shroud from reaching the sensor array.

2. The sensor system according to claim 1, wherein the sensor array comprises a focal plane array (FPA).

3. The sensor system according to claim 1, further including an actuator to control a position of the reflective surface and/or the shroud.

4. The sensor system according to claim 1, further including a thermal reference source to provide the configuration energy.

5. The sensor system according to claim 1, wherein the channels comprise first and second channels that are substantially perpendicular to each other.

6. The sensor system according to claim 1, wherein the first, second, third, and fourth channels are each separated by about ninety degrees.

7. The sensor system according to claim 1, wherein the shroud and the reflective surface are machined from the same block of material.

8. The sensor according to claim 1, wherein the reflective surface moves independently of the shroud.

9. A method, comprising:
   employing a body having a reflective surface in a sensor system, wherein the body is rotatable about a longitudinal axis;
   employing a plurality of channels to provide respective closed paths from an entry into the channels to the reflective surface wherein the plurality of channels comprises first, second, third, and fourth channels;
   employing a shroud to selectively block one or more of the channels, wherein the shroud has a first position to create a path from a first channel of the plurality of channels configured for receiving target energy to the reflective surface while blocking at least a second channel of the plurality of channels, and a second position to create a path from the second channel configured for receiving configuration energy to the reflective surface while blocking at least the first channel; and
   employing a sensor array to receive energy reflected by the reflective surface,
   wherein the shroud in the first position is configured such that energy from the first channel is reflected by the reflective surface to the sensor array, energy from the second and third channels is blocked by the shroud from reaching the sensor array, and energy from the fourth channel is blocked by the body and/or the shroud from reaching the sensor array.

10. The method according to claim 9, wherein the sensor array comprises a focal plane array (FPA).

11. The method according to claim 9, further including employing an actuator to control a position of the reflective surface and/or the shroud.

12. The method according to claim 9, further including employing a thermal reference source to provide the configuration energy.

13. The method according to claim 9, wherein the channels comprise first and second channels that are substantially perpendicular to each other.

14. The method according to claim 9, wherein the first, second, third, and fourth channels are each separated by about ninety degrees.

15. The method according to claim 9, wherein the shroud and the reflective surface are machined from the same block of material.

16. The method according to claim 9, wherein the reflective surface moves independently of the shroud.

17. The sensor system according to claim 1, wherein a plane of the reflective surface extends into the second and third channels in the first position as respective entries into the second and third channels are lateral to the reflective surface.

18. The method according to claim 9, wherein a plane of the reflective surface extends into the second and third channels in the first position as respective entries into the second and third channels are lateral to the reflective surface.

\* \* \* \* \*